No. 689,284. Patented Dec. 17, 1901.
C. C. WORTHINGTON.
VALVE MOVEMENT FOR STEAM ENGINES.
(Application filed Sept. 1, 1897.)
(No Model.) 6 Sheets—Sheet 1.

Fig. 1.

Attest:
J. A. Graves
A. D. Bourke

Inventor:
Charles C. Worthington
By Philipp Philip Lange
Attys.

No. 689,284. Patented Dec. 17, 1901.
C. C. WORTHINGTON.
VALVE MOVEMENT FOR STEAM ENGINES.
(Application filed Sept. 1, 1897.)
(No Model.) 6 Sheets—Sheet 2.

No. 689,284. Patented Dec. 17, 1901.
C. C. WORTHINGTON.
VALVE MOVEMENT FOR STEAM ENGINES.
(Application filed Sept. 1, 1897.)

(No Model.) 6 Sheets—Sheet 3.

No. 689,284. Patented Dec. 17, 1901.
C. C. WORTHINGTON.
VALVE MOVEMENT FOR STEAM ENGINES.
(Application filed Sept. 1, 1897.)

(No Model.) 6 Sheets—Sheet 4.

Attest:
J. A. Evans.
A. W. Bourke.

Inventor:
Charles C. Worthington
By
Philipp Phelps Sawyer
Attys

No. 689,284. Patented Dec. 17, 1901.
C. C. WORTHINGTON.
VALVE MOVEMENT FOR STEAM ENGINES.
(Application filed Sept. 1, 1897.)
(No Model.) 6 Sheets—Sheet 5.

No. 689,284. Patented Dec. 17, 1901.
C. C. WORTHINGTON.
VALVE MOVEMENT FOR STEAM ENGINES.
(Application filed Sept. 1, 1897.)

(No Model.) 6 Sheets—Sheet 6.

Attest:
J. Graves
A. T. Bourke

Inventor:
Charles C. Worthington
By Philipp Phelps Sanger
Attys

UNITED STATES PATENT OFFICE.

CHARLES C. WORTHINGTON, OF IRVINGTON, NEW YORK.

VALVE-MOVEMENT FOR STEAM-ENGINES.

SPECIFICATION forming part of Letters Patent No. 689,284, dated December 17, 1901.

Application filed September 1, 1897. Serial No. 650,234. (No model.)

*To all whom it may concern:*

Be it known that I, CHARLES C. WORTHINGTON, a citizen of the United States, residing at Irvington, county of Westchester, and State of New York, have invented certain new and useful Improvements in Valve-Movements for Steam-Engines, fully described and represented in the following specification and the accompanying drawings, forming a part of the same.

This invention relates to an improved valve-movement for steam and similar expansion engines of that class in which a single valve controls both the admission and cut-off of steam, the especial object of the invention being to provide an improved valve-movement for duplex engines in which such admission and cut-off valves on each side are opened for the admission of steam by the opposite side of the engine and the valves closed for cut-off by their own side of the engine.

While my improved valve-movement is applicable with duplex engines of other types, it is especially adapted for use with direct-acting duplex pumps and similar direct-acting engines; and the invention consists, partly, in features of construction and combinations in such engines. The invention therefore will be described as thus applied, and for a full understanding of the invention a detailed description of a construction embodying all the features of the invention will now be given in connection with the accompanying drawings, forming a part of this specification, and showing the valve-movement as applied in its preferred form to a duplex direct-acting pumping-engine and a modification thereof, and the features forming the invention will then be specifically pointed out in the claims.

Referring now especially to the construction shown in Figs. 1 to 6ª, the engine shown is, as to general construction, a Worthington triple-expansion duplex direct-acting pumping-engine having high, intermediate, and low pressure cylinders A B C and A' B' C' on opposite sides arranged in line, with the high-pressure cylinder inside, and having the two water-cylinders D D' on opposite sides of the pump, with suction-main E and force-main F, and having their plungers connected to the high-pressure pistons X X' on the opposite sides by the central high-pressure piston-rods Y Y' and the intermediate and low pressure pistons connected to the cross-heads on the piston-rods by side rods $y$ $y'$, passing outside the high-pressure cylinders. Steam is supplied to the high-pressure cylinders through the induction-pipe G, shown as provided with the usual regulator, the exhaust passing from the high-pressure to the intermediate-pressure cylinders through pipe H, from the intermediate to the low pressure cylinders through pipe I, and the low-pressure cylinders exhausting through the exhaust-pipe K and tank L to the suction-main E, as shown, or otherwise, as preferred. The pump is supplied with the compensating cylinders M, of any approved form, which are supplied from the accumulator N through the pipe 10, the pressure for the accumulator being controlled from the top of the usual air-chamber O through the pipe 11, as usual in such constructions.

The steam-cylinders are constructed with the admission-ports 1 at the top of the cylinder and separate exhaust-ports 2 at the bottom of the cylinder, the admission-ports on opposite sides of the engine being controlled for admission and cut-off by oscillating valves $a$ $a'$ and the exhaust-ports 2 by similar oscillating valves $b$ $b'$, separate valves at opposite ends of each of the double-acting cylinders being used. The admission-valves $a$ $a'$ are each connected by crank-arms 12 on the valve-stems and links 13 to rockers $c$ $c'$, mounted on the steam-chests, the links 13 being connected to the cranks 12 by suitable adjustable lost-motion connections 3, so as to secure the proper cut-off and permit the point of cut-off to be adjusted as desired. The rockers $c$ $c'$ of the intermediate and low pressure cylinders are connected to the rockers of the high-pressure cylinders by connecting-rods 14, and the rockers of the high-pressure cylinders are connected by connecting-rods 15 to levers $d$ $d'$ of the valve-movements on the respective sides of the engine and presently to be described. The exhaust-valves $b$ $b'$ on each side are connected together by connecting-rods 16 between the cranks on the valve-stems and by connecting-rods 17 are connected to crank-arms 18 on rock-shafts 19, carrying at their opposite ends crank-arms 20, which are connected by links 21 to crank-arms 22 on the crossover-shafts of the valve-motion, so that the exhaust-valves on each side are actuated from the opposite side of the engine.

The levers $d$ $d'$ on the respective sides of the engine are pivotally mounted on crank-pins 4, carried by crank arms or disks on the ends of the crossover rock-shafts S T, and each lever $d$ or $d'$ is connected by a link $g$ or $g'$ to a crank-pin 6 on a crank arm or disk $h$ or $h'$ upon the other crossover rock-shaft. The lever $d$ on the A cylinder side of the engine is mounted on the end of the crossover rock-shaft S, which is actuated from the A' cylinder side of the engine, and the lever $d'$ on the A' cylinder side of the engine is mounted on the end of the crossover-shaft T, which is actuated from the A cylinder side of the engine, and the lever $d$ is connected by link $g$ to crank-disk $h$ on the shaft T at the A cylinder end of the shaft, and the lever $d'$ on the opposite side of the engine is connected by link $g'$ to crank-disk $h'$ on the shaft S at the A' cylinder end of the shaft. The crank-pins 4, by which the levers $d$ $d'$ are mounted on the shafts S T, actuate these levers from the shafts on which they are mounted for the admission movement of the valves, the pivots 5 then acting as fulcra for the levers, but swinging on crank-pins 6, and the pivots 4 act as fulcra for the levers $d$ $d'$ when the latter are actuated for the cut-off movement of the valves by the links $g$ $g'$ and connections to the other shaft. The shaft T is operated from the A cylinder side of the engine through inside piston-rod $y$ of the intermediate and low pressure cylinders through valve-movement lever U, which is forked at its lower end to straddle the piston-rod and its inner fork having three slotted arms 23, receiving a bowl 24, carried by rod $y$, and its outer fork being formed with a curved guide 25, which receives a second bowl 26, carried by the rod $y$. The three slotted arms 23, with the bowl 24, secure the operation of the lever U as the piston passes the middle of its stroke with lost motion before and after such operation, while the shaft T and pivot-pin 6 are held in a fixed position by the bowl 24, moving in one of the slotted arms 23 at the time the lever $d$ is actuated by the shaft S for the admission movement of the valve. The guide 25, with bowl 26, acts to positively guide and control the lever U and assure the proper movement of the bowl 24 in the slotted arms 23. The shaft S is actuated from the A' cylinder side of the engine through a similar valve-movement lever U', connected to the inner piston-rod $y'$ on the A' cylinder side of the engine by a construction of the same form as described in connection with valve-movement lever U.

Figure 1:
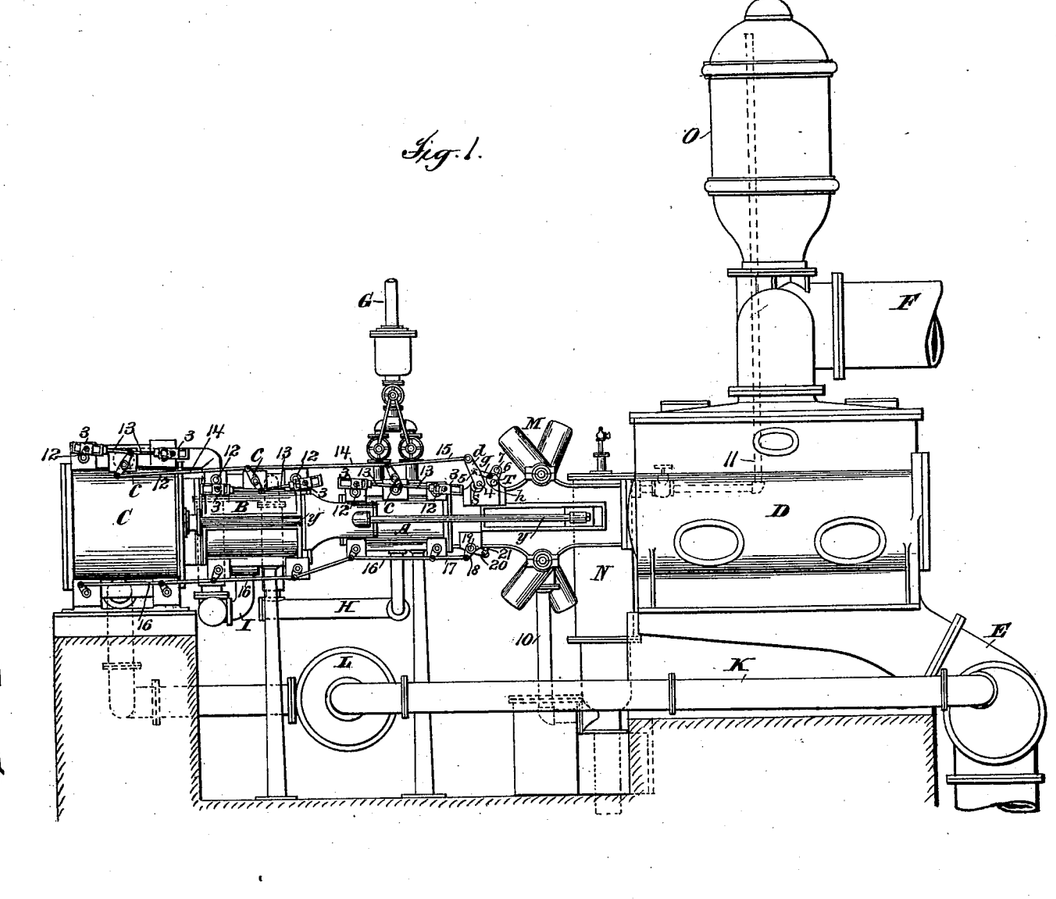
Figure 1 is a side elevation of a triple-expansion duplex pumping-engine embodying the invention.
Figure 2:
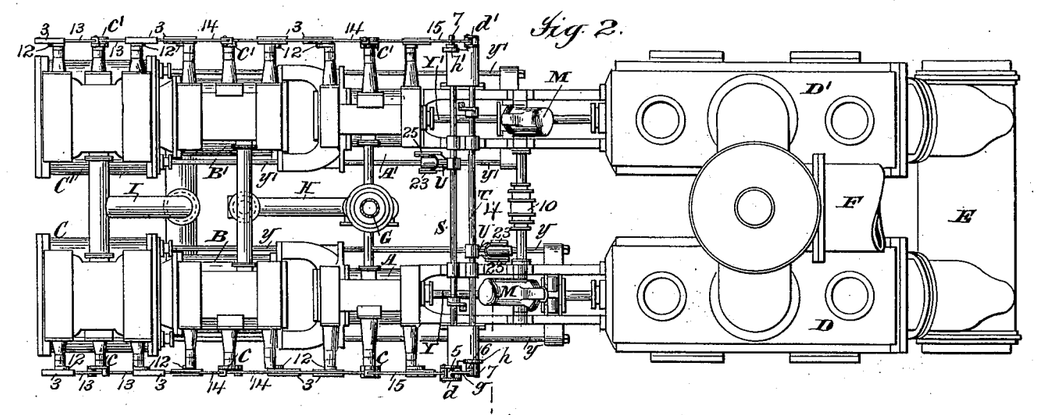
Fig. 2 is a plan view of the same.
Figure 3:
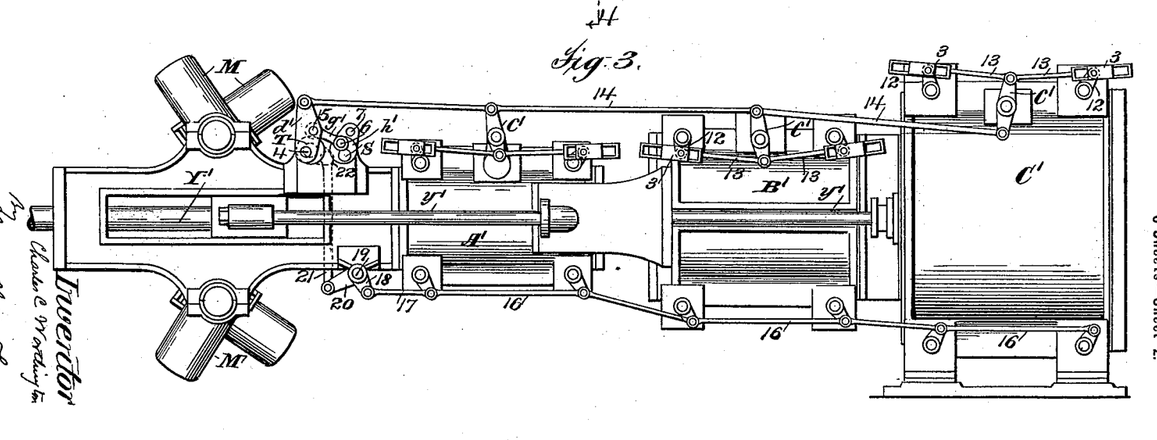
Fig. 3 is a diagrammatic side elevation of the steam end, showing the side opposite that shown in Fig. 1 and on a larger scale.
Figure 4:
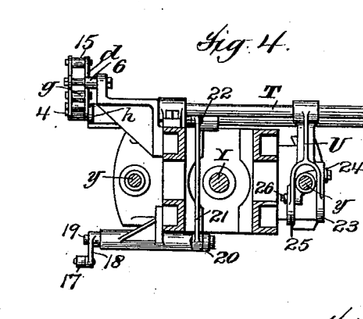
Fig. 4 is a detail cross-section on the line 4 of Fig. 2, showing the crossover-motion on one side with the valve connections omitted.
Figure 5:
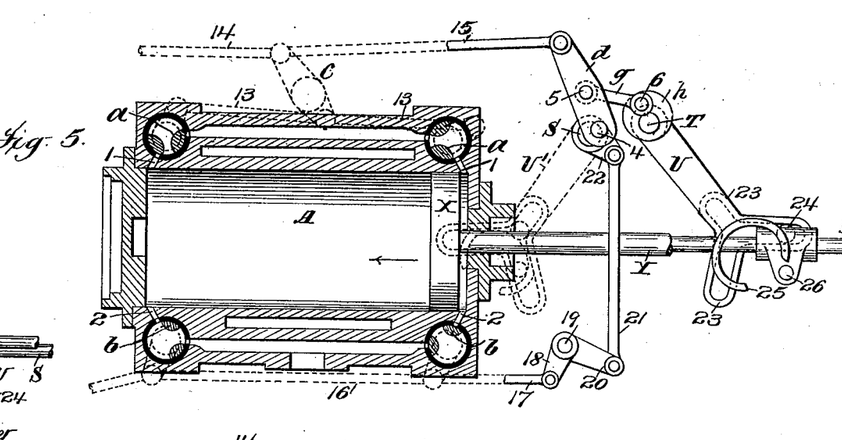
Figs. 5 and 5ª are diagrammatic sectional views of the cylinders on opposite sides of the engine looking in the same direction and showing the parts in the same position as in the general views.
Figure 5A:
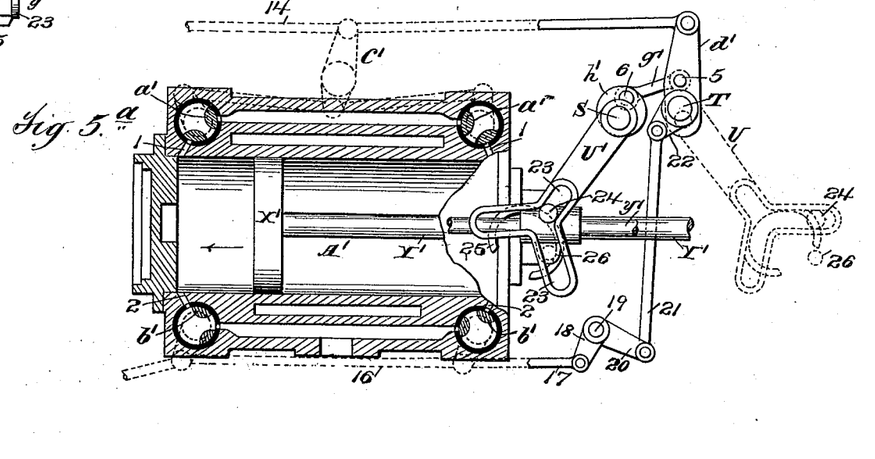
Figure 6:
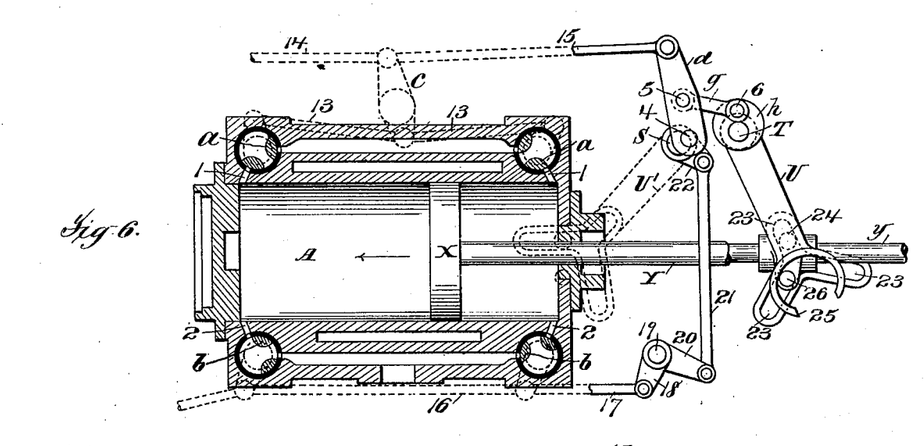
Figs. 6 and 6ª are similar views showing the parts in another position.
Figure 6A:
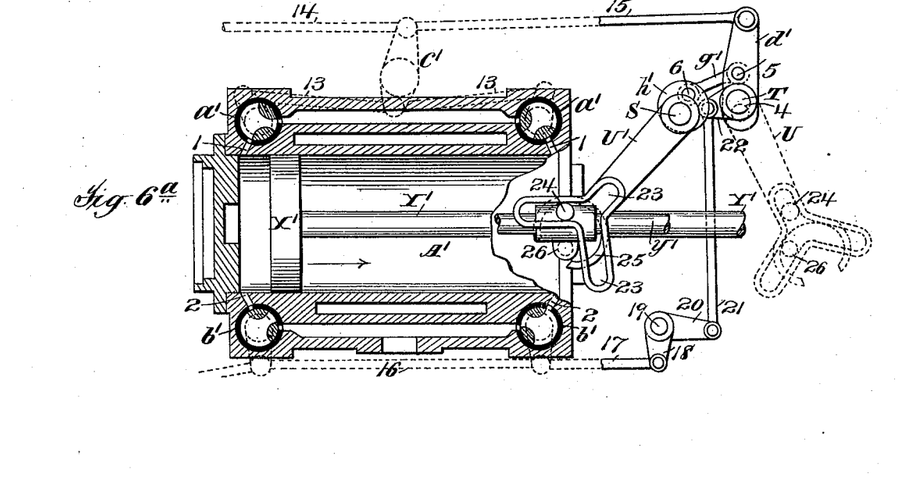

The operation of the construction will be understood from the drawings with a brief description in connection with the high-pressure cylinders, referring especially to Figs. 5 and 5$^a$ and Figs. 6 and 6$^a$. As shown in Figs. 5 and 5$^a$, piston X is just about to start its stroke to the left, the valve $a$ at the right end of the cylinder A having been opened and the exhaust-valve $b$ shifted by the movement of the piston X' on the opposite side of the engine, which is now moving to the left and somewhat past the middle of its stroke. As the piston X moves to the left the stud 24 first moves in one of the slotted arms 23 of valve-movement lever U without operating the lever, and then as it passes into the slot extending longitudinally of the lever commences to move the latter, and thus rocks the shaft T and through the link $g$ rocks the lever $d$ to the right in Fig. 5, the lever rocking on the pivot-pin 4, by which it is mounted on the end of the shaft S, and thus through connecting-rod 15 rocks the upper end of the rocker $c$ to the right, and thus throws the lower end of the rocker to the left, and through the link 13 and lost-motion connections 3 actuates the valve $a$ at the right end of the cylinder A, so as to cut off the steam, this being done in the construction shown when the cylinder has made about one-third stroke. The movement of the rock-shaft T when the piston X reaches the proper point in the stroke also moves the lever $d'$ on the opposite side of the engine by rocking this lever on its swinging pivot-pin 5, so as to throw the lower end of the lever to the left in Fig. 5$^a$ and the upper end of the lever to the right, and thus through the connecting-rod 15 moves the upper end of the rocker $c'$ to the right and the lower end of the rocker to the left, and by the link 13 and lost-motion connections 3 oscillates the valve $a$ at the left end of cylinder A', so as to open this valve for the reversal of the piston at the end of its stroke. This rocking of the shaft T, also through crank-arm 22 and the connections shown and previously described, shifts the exhaust-valves $b'$ at the opposite ends of the cylinder A', so as to close the exhaust-valve at the left end of the cylinder and open the exhaust-valve at the right end of the cylinder for the reversal of the piston.

The positions of all the parts of the valve-movement on the high-pressure cylinders on the opposite sides of the engine when the piston X has reached the point of cut-off in its movement to the left and the piston X' has finished its stroke and started upon its return stroke are shown in Figs. 6 and 6ª. As the parts continue their movement from the position shown in Figs. 6 and 6ª the piston X completes its stroke to the left, and then as the piston X' reaches the proper position in its movement to the right the latter rocks the shaft S through lever U', and thus rocks the lever $d$ on its swinging pivot-pin 5, so that the lower end of the lever is thrown toward the right and its upper end to the left in Fig. 6, and thus through connecting-rod 15, rocker $c$, and link 13 shifts the valve $a$ at the left end of the cylinder into position for the admission of steam, and at the same time the shaft S, through crank 22 and the connections previously described, shifts the exhaust-valves $b$ at the opposite ends of the cylinder A, so as to close the exhaust-port at the left end of the cylinder and open the exhaust-port at the right end of the cylinder, and the piston X then commences its return stroke—that is, to the right in the drawings. The piston X' by rocking shaft S through the lever U' has also at the proper point in its stroke through the crank-disk $h'$ and link $g'$ rocked the lever $d'$ on the same side of the engine as the piston, so that the lever $d'$ is moved to the left, rocking on its pivot-pin 4 on shaft T, and thus through the connecting-rod 15, rocker $c'$, and link 13 the valve $a$ at the left end of the cylinder A' is oscillated so as to cut off the steam behind the piston X', this cut-off occurring in the construction shown when the piston X has moved a short distance to the right from the position shown in Fig. 6ª or at about one-third stroke. When the piston X' reaches the end of its stroke to the right, the piston X, which is then moving to the right on its return stroke, as above described, rocks the shaft T through the lever U, and thus rocks the lever $d'$ upon its swinging pivot 5, so as to move the lower end of the lever $d'$ to the right in Fig. 6ª and the upper end of the lever $d'$ to the left, and thus through the connecting-rod 15, rocker $c'$, and link 13 shifts the valve $a$ at the right end of the cylinder A', so as to admit steam to that end of the cylinder, and at the same time through the crank 22 on shaft T and the connections previously described shifts the valves $b'$ at opposite ends of the cylinder A', so as to close the exhaust-port at the right end of the cylinder and open the exhaust-port at the left end of the cylinder, and the piston X' then starts upon its return stroke—that is, to the left in the drawings. As the movement of the pistons is continued they return to the position shown in Figs. 5 and 5ª, as will be understood from the above description, and the cycle of operations is then repeated.

When it is desired to run the engine low duty—that is, without the cut-off—and admit steam throughout the stroke, the links $g$ $g'$ may be detached from the crank-disks $h$ $h'$ and pivotally mounted on fixed pins 7, properly located on the frame, so that the levers $d$ $d'$ are actuated only from the opposite side of the engine, rocking upon the swinging pivots 5, which then form the fulcra of the levers in all cases.

It will be seen that the movement of pins 24 in the slotted arms 23 of levers U U' acts to hold the levers and shafts stationary during the lost motion between the piston-rods and levers. The result is that each of the pivots 4 6 on the shafts S T is held stationary during the operation of the levers $d$ $d'$ by the movement of the other pivot, thus securing the fixed bearing desired for the proper action of the levers $d$ $d'$ from the two rock-shafts.

The features of providing for lost motion between the valve-movement and the piston-rod or other valve-actuating part of the engine and of holding each pivot of the shifting fulcrum of the levers $d$ $d'$ stationary while the levers are actuated by the other pivot are important features of the preferred form of my valve-movement, although the invention is not limited to such a construction. In constructions employing a single valve for admission and cut-off it is important to avoid lost motion acting on the admission movement of the valves between the rock-shafts and the valves, because any such lost motion affects the cut-off as well as the admission, so that a fixed point of cut-off is not secured. On account of the variation in the length of the stroke which occurs in such direct-acting engines under varying running conditions also it is important that the valve-movement should be actuated for admission at or near the middle of the stroke with lost motion between the piston and valve at the beginning and end of the stroke, so that the valves are fully opened for admission, although the stroke of the piston be shortened. By the construction shown the valve-movement levers are actuated only near the middle of the stroke, so that the length of the stroke may be varied widely without affecting the admission movement of the valves, while at the same time by placing the admission lost motion between the piston and valve-motion rock-shaft it does not affect the point of cut-off of the valve on the opposite side of the engine, which is controlled by its own piston. During this lost motion, however, each piston-rod acts to hold its valve-movement lever stationary, and thus secures the fixed bearing-point desired for the action of the levers $d$ $d'$, as above described.

Figure 7:
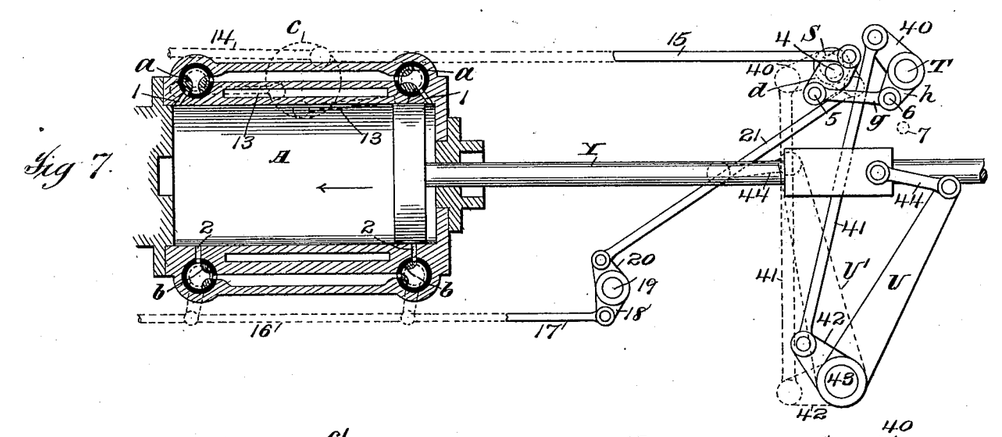
Figs. 7 and 7ª and Figs. 8 and 8ª correspond, respectively, to Figs. 5 and 5ª and Figs. 6 and 6ª, showing the same positions of parts with a modified form of valve-movement.
Figure 7A:
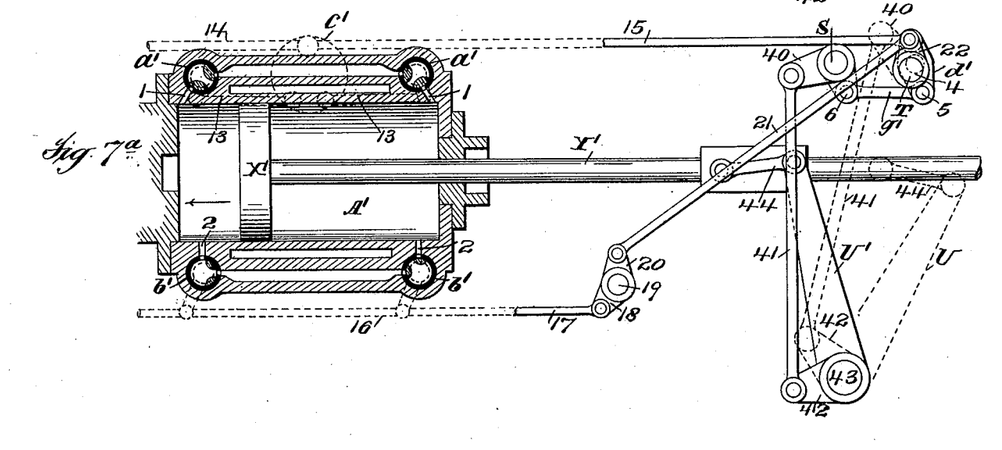
Figure 8:
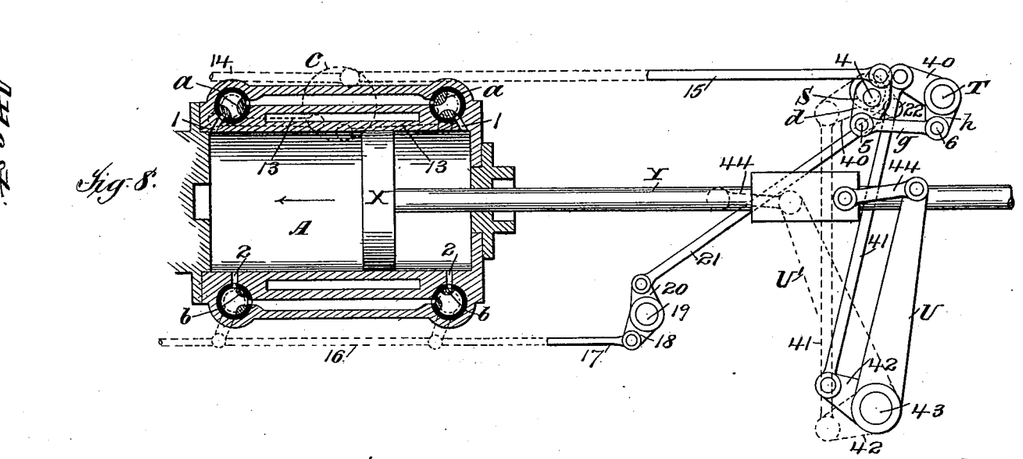
Figure 8A:
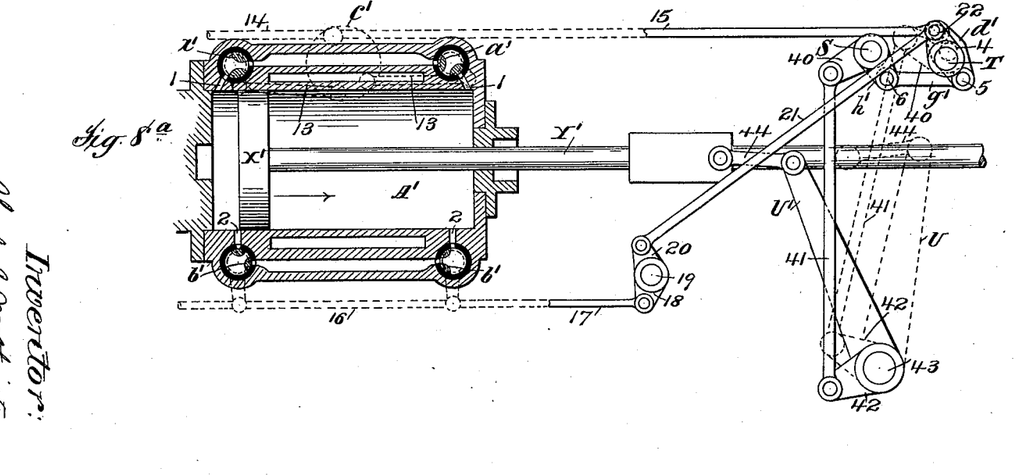

In Figs. 7 and 7ª and Figs. 8 and 8ª I have shown a modified construction in which levers corresponding to levers $d$ $d'$ are used for actuating the valves $a$ $a'$ for admission and cut-off in the same manner as above described, but the manner of mounting and means for operating these levers are different from the construction above described. In this construction similar reference letters and figures will be used for corresponding parts for convenience of description and correct understanding of the relation between the two constructions. The levers d d' are mounted on the crank-pins 4 on shafts S T, as before, but between their connections to the links 15 and to the links g g', the upper ends of the levers d d' being connected by rods 15 to the rockers c c' and the lower ends of the levers d d' being connected by links g g' to the pins 6 on cranks h h' on the shafts T S. The rock-shafts S T are rocked from the main piston-rods Y Y' in this construction and without the lost-motion connections of the construction previously described, the shafts S T being provided with the crank-arms 40, connected by links 41 to crank-arms 42 on rock-shafts 43 below the piston-rods, these rock-shafts 43 being rocked by their valve-movement levers U U', connected directly to the main piston-rods Y Y' or cross-heads thereon by links 44. The connections from the shafts S T to the exhaust-valves are substantially the same as in the construction previously described and are numbered correspondingly, and the operation of the exhaust-valves and these connections is the same except that of course the direction of rotation of the shafts S T relatively to the direction of movement of the pistons Y Y' is reversed from the construction previously described, which reversal results from the connection between the valve-movement levers U U' and these shafts. The operation of this construction will be understood from the drawings in connection with the above full description of the operation of the construction shown in Figs. 1 to 6ᵃ and the following brief description: The position of the parts in Figs. 7 and 7ᵃ and Figs. 8 and 8ᵃ corresponds exactly to Figs. 5 and 5ᵃ and Figs. 6 and 6ᵃ. As piston X moves to the left from the position shown in Fig. 7 the valve-movement lever U moves to the left with it and through rock-shaft 43, crank 42, link 41, and crank 40 rocks shaft T, so as to move the crank h to the right, and thus through the link g move the lower end of the lever d to the right and the upper end of the lever to the left, the lever d rocking on its intermediate pivot 4 on the shaft S. This movement of lever d through rod 15, connected to the upper end of the lever, moves the rocker c, so as to throw the lower side to the right, and thus through the link 13 actuates the valve a at the right end of the cylinder A and oscillates it into the position shown in Fig. 8, so as to cut off the steam. The movement of the rock-shaft T by piston X also when the piston X reaches the proper point in the stroke moves the lever d' on the opposite side of the engine by rocking this lever on its swinging pivot 5 on link g, so as to throw the upper end of the lever to the right, and thus through the connecting-rod 15 shift the rocker c', so as to move its lower side to the left and through the link 13 oscillate the valve a' at the left end of the cylinder A' into position for the admission of steam to the cylinder for the reversal of the piston X' at the proper time, and this rocking of the shaft T through the crank 22 and connections shifts the exhaust-valves b' so as to open and close the exhaust, as in the construction previously described. The movement of the piston X' is transmitted to its own valves a' for cut-off and to the valves a b of the cylinder A for admission and exhaust through the corresponding connections and in a similar manner.

While the valve-movement has been shown and described as applied in connection with separate exhaust-valves, and this is preferred, and such a construction forms a part of the invention, it will be understood that the invention, broadly considered, is applicable also to that class of constructions in which a single valve controls the admission, cut-off, and exhaust, and that my valve-movement may be used with valves of different form and motion from those shown. It will be understood also that many modifications may be made in the constructions illustrated without departing from the invention, and I am not to be limited to the exact form or arrangement of any of the devices shown.

What I claim is—

1. The combination with two cylinders and a single valve at each end of each cylinder controlling the admission and cut-off of the motor fluid, of a single lever for each cylinder connected to the valves, and connections between each of said levers and the pistons of both of the cylinders for operating the valves for admission and cut-off, substantially as described.

2. The combination with two cylinders and a single valve at each end of each cylinder controlling the admission and cut-off of the motor fluid, of a single lever for each cylinder connected to the valves, connections between each of said levers and the pistons of both of the cylinders for operating the valves for admission and cut-off, and separate exhaust-valves and means for operating the same, substantially as described.

3. The combination with two cylinders and single valves controlling the admission and cut-off of the motor fluid, of a lever for each cylinder, connections between said levers and the valves, and connections between each of said levers and the pistons of both the cylinders, all combined and operating to actuate the valves of each cylinder by the piston of the other cylinder to admit the motor fluid and by its own piston to cut off the motor fluid, substantially as described.

4. The combination with two cylinders and single valves controlling the admission and cut-off of the motor fluid, of a lever for each cylinder, connections between said levers and the valves, connections between each of said levers and the pistons of both the cylinders, all combined and operating to actuate the valves of each cylinder by the piston of the other cylinder to admit the motor fluid and by its own piston to cut off the motor fluid, and separate exhaust-valves and means for actuating the exhaust-valves of each cylinder by the piston of the other cylinder, substantially as described.

5. The combination with two cylinders and single valves controlling the admission and cut-off of the motor fluid, of a lever for each cylinder having two pivots, connections between said levers and the valves, and connections between said pivots and the respective pistons for rocking the lever by one of said pistons to admit the motor fluid and by the other piston to cut off the motor fluid, substantially as described.

6. The combination with two cylinders and a single valve at each end of each cylinder controlling the admission and cut-off of the motor fluid, and a rocker connected to the valves, of a lever for each cylinder having two pivots, connections between said levers and the rockers, and connections between said pivots and the respective pistons for rocking the lever by one of said pistons to admit the motor fluid and by the other piston to cut off the motor fluid, substantially as described.

7. The combination with two cylinders, and single valves controlling the admission and cut-off of the motor fluid, of rock-shafts connected to the respective pistons, a lever for each cylinder pivoted on a crank on one of the shafts and having a link-and-crank connection with the other shaft, and connections between said levers and the valves, all combined and operating to actuate the valves of each cylinder by one of the shafts to admit the motor fluid and by the other shaft to cut off the motor fluid, substantially as described.

8. The combination with two cylinders and single valves controlling the admission and cut-off of the motor fluid, of rock-shafts connected to the respective pistons, a lever for each cylinder pivoted on a crank on the rock-shaft actuated by the piston of the other cylinder and having a link-and-crank connection with the shaft actuated by the piston of its own cylinder, and connections between said levers and the valves, all combined and operating to actuate the valves of each cylinder by the piston of the other cylinder to admit the motor fluid and by its own piston to cut off the motor fluid, substantially as described.

9. The combination with two cylinders and single valves controlling the admission and cut-off of the motor fluid, of rock-shafts connected to the respective pistons, a lever for each cylinder pivoted on a crank on one of the shafts, connections between said levers and the valves, and a link from each lever intermediate between the valve connection and crank and connecting said lever to a crank on the other shaft, all combined and operating to actuate the valves of each cylinder by one of the shafts to admit the motor fluid and by the other shaft to cut off the motor fluid, substantially as described.

10. The combination with two cylinders and a single valve at each end of each cylinder controlling the admission and cut-off of the motor fluid, of rock-shafts connected to the respective pistons, a lever for each cylinder pivoted on a crank on one of the shafts and having a link-and-crank connection with the other shaft, a rocker for each cylinder connected to the valves, and connections between said levers and the rockers, all combined and operating to actuate the valves of each cylinder by one of the shafts to admit the motor fluid and by the other shaft to cut off the motor fluid, substantially as described.

11. The combination with two cylinders and a single valve at each end of each cylinder controlling the admission and cut-off of the motor fluid, of rock-shafts connected to the respective pistons, a lever for each cylinder pivoted on a crank on the rock-shaft actuated by the piston of the other cylinder and having a link-and-crank connection with the shaft actuated by the piston of its own cylinder, a rocker for each cylinder connected to the valves, and connections between said levers and the rockers, all combined and operating to actuate the valves of each cylinder by the piston of the other cylinder to admit the motor fluid and by its own piston to cut off the motor fluid, substantially as described.

12. The combination with two cylinders and a single valve at each end of each cylinder controlling the admission and cut-off of the motor fluid, of rock-shafts connected to the respective pistons, a lever for each cylinder pivoted on a crank on one of the shafts and having a link-and-crank connection with the other shaft, a rocker for each cylinder connected to the valves, connections between said levers and the rockers, all combined and operating to actuate the valves of each cylinder by one of the shafts to admit the motor fluid and by the other shaft to cut off the motor fluid, and separate exhaust-valves and means for operating the same, substantially as described.

13. The combination with two cylinders and a single valve at each end of each cylinder controlling the admission and cut-off of the motor fluid, of rock-shafts connected to the respective pistons, a lever for each cylinder pivoted on a crank on the rock-shaft actuated by the piston of the other cylinder and having a link-and-crank connection with the shaft actuated by the piston of its own cylinder, connections between said levers and the valves, separate exhaust-valves, and connections for operating the exhaust-valves of each cylinder from the rock-shaft actuated by the piston of the other cylinder, all combined and operating to actuate the valves of each cylinder by the piston of the other cylinder to admit and exhaust the motor fluid and by its own piston to cut off the motor fluid, substantially as described.

14. The combination with two cylinders and single valves controlling the admission and cut-off of the motor fluid, of two rock-shafts, one of said rock-shafts being connected to and actuated by one of the respective pistons and the other rock-shaft being connected to and actuated by the other piston by means securing lost motion between each piston and its rock-shaft at the beginning and end of the stroke, and connections between each of said rock-shafts and the valves of both cylinders for actuating the valves to admit and cut off the motor fluid, substantially as described.

15. The combination with two cylinders and single valves controlling the admission and cut-off of the motor fluid, of two rock-shafts, one of said rock-shafts being connected to and actuated by one of the respective pistons and the other rock-shaft being connected to and actuated by the other piston by means securing lost motion between each piston and its rock-shaft at the beginning and end of the stroke, connections between each of said rock-shafts and the valves of both cylinders for actuating the valves of each cylinder by the piston of the other cylinder to admit the motor fluid and by its own piston to cut off the motor fluid, and means for holding each of said rock-shafts stationary during the operation of the valves by the other rock-shaft, substantially as described.

16. The combination with two cylinders and single valves controlling the admission and cut-off of the motor fluid, of two rock-shafts, one of said rock-shafts being connected to and actuated by one of the respective pistons and the other rock-shaft being connected to and actuated by the other piston by means securing lost motion between each piston and its rock-shaft at the beginning and end of the stroke, a lever for each cylinder pivoted on a crank on the rock-shaft actuated by the piston of the other cylinder and having a link-and-crank connection with the shaft actuated by the piston of its own cylinder, and connections between said levers and the valves, all combined and operating to actuate the valves of each cylinder by the piston of the other cylinder to admit the motor fluid and by its own piston to cut off the motor fluid, substantially as described.

17. The combination with two cylinders and single valves controlling the admission and cut-off of the motor fluid, of two rock-shafts, one of said rock-shafts being connected to and actuated by one of the respective pistons and the other rock-shaft being connected to and actuated by the other piston by means securing lost motion between each piston and its rock-shaft at the beginning and end of the stroke, a lever for each cylinder pivoted on a crank on the rock-shaft actuated by the piston of the other cylinder and having a link-and-crank connection with the shaft actuated by the piston of its own cylinder, connections between said levers and the valves, all combined and operating to actuate the valves of each cylinder by the piston of the other cylinder to admit the motor fluid and by its own piston to cut off the motor fluid, and means for holding each of said rock-shafts stationary during the operation of the valves by the other rock-shaft, substantially as described.

18. The combination with two cylinders and single valves controlling the admission and cut-off of the motor fluid, of valve-operating mechanism for actuating the valves of each cylinder to admit the motor fluid by the piston of the other cylinder and to cut off the motor fluid by its own piston and connected to the respective pistons by means securing lost motion between the operating mechanism and pistons at the beginning and end of the stroke, substantially as described.

19. The combination with two cylinders and single valves controlling the admission and cut-off of the motor fluid, of a lever for each cylinder connected to both pistons by separate means securing lost motion between the piston and lever at the beginning and end of the stroke, connections between the levers and the valves, and means for holding the connections between each of the pistons and a lever stationary while the lever is being actuated by the other piston, substantially as described.

20. The combination with two cylinders and single valves controlling the admission and cut-off of the motor fluid, of connections between each of said valves and the pistons of both cylinders, whereby the valves of each cylinder are actuated by both of the pistons for the operation of the valves with cut-off, the connections between each of the valves and one of the pistons being adapted to be secured in a fixed position for the operation of the valves without cut-off, substantially as described.

21. The combination with two cylinders and single valves controlling the admission and cut-off of the motor fluid, of rock-shafts connected to the respective pistons, connections between each of the valves and both of said rock-shafts whereby the valves of each cylinder are actuated by one of the shafts to admit the motor fluid and by the other shaft to cut off the motor fluid, the cut-off connections being adapted to be secured in a fixed position for the operation of the valves without cut-off, substantially as described.

22. The combination with two cylinders and single valves controlling the admission and cut-off of the motor fluid, of a lever for each cylinder having two pivots and connections between said pivots and the respective pistons whereby the lever is rocked on one of its pivots by one of the pistons and on the other of said pivots by the other piston, and connections between said levers and the valves, all combined and operating to actuate the valves of each cylinder by one of the pistons to admit the motor fluid and by the other piston to cut off the motor fluid, the cut-off connections between the levers and pistons being adapted to be secured in a fixed position for the operation of the valves without cut-off, substantially as described.

In testimony whereof I have hereunto set my hand in the presence of two subscribing witnesses.

CHAS. C. WORTHINGTON.

Witnesses:
B. W. PIERSON,
LOUIS R. ALBERGER.